(12) United States Patent
Vanroose et al.

(10) Patent No.: US 11,523,649 B2
(45) Date of Patent: Dec. 13, 2022

(54) GARMENT PATTERN OPTIMIZATION SYSTEM AND METHOD

(71) Applicant: POLYGONAL BVBA, Hoboken (BE)

(72) Inventors: Wim Vanroose, Hoboken (BE); Samira Lafkioui, Hoboken (BE)

(73) Assignee: POLYGONAL BVBA, Hoboken (BE)

(*) Notice: Subject to any disclaimer, the term of this patent is extended or adjusted under 35 U.S.C. 154(b) by 131 days.

(21) Appl. No.: 16/958,526

(22) PCT Filed: Dec. 6, 2018

(86) PCT No.: PCT/EP2018/083855
§ 371 (c)(1),
(2) Date: Jun. 26, 2020

(87) PCT Pub. No.: WO2019/129472
PCT Pub. Date: Jul. 4, 2019

(65) Prior Publication Data
US 2021/0052028 A1 Feb. 25, 2021

(30) Foreign Application Priority Data

Dec. 29, 2017 (EP) .................................. 17211145

(51) Int. Cl.
*A41H 3/00* (2006.01)
*G05B 19/4155* (2006.01)

(52) U.S. Cl.
CPC ......... *A41H 3/007* (2013.01); *G05B 19/4155* (2013.01); *G05B 2219/45196* (2013.01)

(58) Field of Classification Search
CPC ................ A41H 3/007; G05B 19/4155; G05B 19/45196; Y10S 706/904
(Continued)

(56) References Cited

U.S. PATENT DOCUMENTS 3,887,903 A * 6/1975 Martell ...................... G06T 3/00
700/132
4,916,634 A * 4/1990 Collins .................. A41H 3/007
706/62
(Continued)

OTHER PUBLICATIONS

International Search Report and Written Opinion from PCT Application No. PCT/EP2018/083855, dated Jan. 31, 2019.
(Continued)

*Primary Examiner* — Nathan E Durham
(74) *Attorney, Agent, or Firm* — Workman Nydegger (57) ABSTRACT

According to an embodiment, the invention relates to a computer implemented method for grading a pattern from a first size to a second size, the pattern comprising one or more panels, the method comprising the steps of a representation step comprising representing each panel of the one or more panels by a contour, wherein a contour comprises one or more segments, a constraint step comprising imposing constraints on segments for grading to the second size; generating a mesh of each panel of the one or more panels thereby obtaining a first set of meshes; combining the first set of meshes with the constraints into a system of equations; solving the system of equations into a second set of meshes, wherein the contours of the second meshes correspond to the pattern in the second size and representing the contours of the second set of meshes.

12 Claims, 7 Drawing Sheets

(58) Field of Classification Search
USPC .................................................. 700/130–132
See application file for complete search history.

(56) References Cited

U.S. PATENT DOCUMENTS

| | | | |
|---|---|---|---|
| 4,926,344 A * | 5/1990 | Collins | .................. A41H 3/007 |
| | | | 706/53 |
| 5,107,444 A | 4/1992 | Wu | |
| 5,757,661 A | 5/1998 | Surville | |
| 6,369,815 B1 | 4/2002 | Celniker | |
| 2004/0049309 A1 | 3/2004 | Gardner | |
| 2007/0169358 A1 | 7/2007 | Segovia | |
| 2015/0134302 A1* | 5/2015 | Chhugani | ............... G06T 17/00 |
| | | | 703/1 |
| 2015/0243076 A1 | 8/2015 | Jeong | |
| 2019/0304182 A1* | 10/2019 | Oh | .......................... G06T 17/20 |

OTHER PUBLICATIONS

Extended Search Report from Corresponding EP Application No. EP17211145.2, dated May 29, 2018.

* cited by examiner

GARMENT PATTERN OPTIMIZATION SYSTEM AND METHOD

FIELD OF THE INVENTION

The present invention relates to a system and method for grading a pattern of a particular garment from a given standard size, comprising a plurality of panels or pieces, to another desired size.

BACKGROUND OF THE INVENTION

The human body is a dynamical three-dimensional object determined by a multitude of distance parameters, such as, for example, a height, a width, a depth, but also a circumference of a neck or a leg length. Roughly, a body may be modelled by a flattened cylindrical framework supplemented by a number of secondary curves and bulges that define the three-dimensional shape of a body.

Clothing or garments are fabricated out of a set of two-dimensional pieces which, when combined, result in a shape that suits a body. Each type of garment, such as a skirt, pants or shirt, is composed out of a set of pieces, each with a particular shape.

In order to design clothes out of a flat two-dimensional surface, a well-known practice applied by textile designer is pattern making. A pattern is a template comprising pieces, also called panels, represented on, for example, a sheet of paper. These panels may then be cut out of a fabric by putting the paper on the fabric and duplicating the contours of the panels on the fabric. Subsequently the panels are cut out of the fabric and sewed together resulting in the desired garment.

Generally, a pattern is drafted corresponding to a standard clothing size used for garments sold off-the-shelf. Basically, such sizes are, for example, defined as small, medium and large and may further differ geographically. It should be clear that a standard size refers to a size which may fit to a majority group of people in order to fabricate the corresponding garments in bulk.

When a pattern is used to fabricate a garment according to a custom-made size, each of the panels needs to be adapted to this custom-made size starting from the standard size. Thus, each piece of the pattern needs to be transformed in size as a function thereof. The process of transforming a set of panels from one size to another one is also called grading the pattern.

Basically, when grading, characteristic points are marked on the panels of the base pattern, and a new set of panels is constructed by applying grading rules by shifting and/or twisting these points. Such grading rules or grading formulae are known for a number of type of garments, and by applying the proper grading rule, a given pattern is graded to a custom-made size. Often, the knowledge and know-how in applying the proper rules lies in the experience of tailors.

The grading may also be automated through the use of a database comprising grading rules as, for example, disclosed in document US2007/0169358A1. Therein, a method is disclosed which subdivides a panel in regions and for each region a grading rule is applied in order to grade the complete pattern. The proper grading rule is identified by a grading mask comprising images of panels of a reference garment of the same type of garment to be graded.

In document U.S. Pat. No. 5,757,661 a similar computing grading system is disclosed comprising a database containing one or more scales of standard measurements of target populations for which garments are to be created. The database is further extended by means for automatically generating grading rules from new scales of measurements. Such new generated grading rules are deduced by identifying relations between the new scales of measurements and knowledge relating to a specific garment.

A drawback of using grading rules is that it may result in unsuccessful grading. Since the characteristic points are shifted and/or twisted, it occurs that inconsistencies arise over different panels of the garment, and thus sewing of the different panels into a garment becomes impracticable. The reason thereto is that grading rules are generally based on multiplication coefficients between the various sizes, without comprising any type of mechanism to avoid inconsistencies. Still, even if they comprise such a type of mechanism, this implies that the rule is only applicable to a limited set of sizes. Secondly, a grading rule may even not be present or deducible at all, for example, for a new type of garment.

Instead of using grading rules, a pattern may also be graded by transforming the garment in a three-dimensional, 3D, environment. As a starting point, the garment is either directly designed in the 3D environment by, for example, a computer-aided design, CAD, system, or designed in a two-dimensional, 2D, environment, such as on paper, and subsequently transformed in 3D. In this 3D environment, the garment is graded by adapting a number of distance parameters and afterwards again transformed in 2D. The latter step is performed by so-called flattening techniques, as for example disclosed in document U.S. Pat. No. 5,107,444 or US2017/0109926A1, thereby obtaining a set of panels suitable to fabricate the garment according to a desired size. The technique of transforming a 3D garment in a 2D set of panels is also denominated as unfolding.

However, some drawbacks of transforming a 3D garment into a set of 2D panels exist. For example, a seam may appear at undesirable locations of the sewed garment, such as on a belly. Secondly, a deep insight in the correspondence between 2D and 3D is required. Thirdly, when applying the technique of unfolding on, for example, complex shapes of garments, it may lead to a set of panels which are unpractically to stich or sew. Finally, intensive computer power is needed to make the transformations between the 2D and 3D environment, and, thus, may be a bottleneck in the grading process.

The use of grading rules may also be combined with a 3D representation of the garment to be graded. Such a technique is disclosed in US2004/0049309A1 wherein grading rules are applied in the 3D environment instead of the 2D one. Next, after applying these rules, the flattening process generates a set of panels which are as close as possible to the modified 3D representation when sewn and draped. Nevertheless, again a transformation is performed to 3D, thus similar drawbacks as already discussed persist.

It is therefore an object of the present invention to alleviate the above drawbacks and to provide an improved solution for grading any type of garment in an efficient manner, which lead to a set of panels that fulfil to the rules applied on the garment in question.

SUMMARY OF THE INVENTION

This object is achieved, in a first aspect, by a computer implemented method for grading a pattern suitable for fabricating a garment from a first size to a second size, the pattern comprising one or more panels, a panel comprising a two-dimensional closed domain, the method comprising the steps of:

a first representation step comprising representing each panel of the one or more panels by a contour enclosing its respective closed domain, wherein a contour comprises one or more segments;

a constraint step comprising imposing one or more constraints on one or more segments of a contour for grading to the second size;

generating a mesh of each panel of the one or more panels thereby obtaining a first set of meshes;

combining the first set of meshes with the constraints into a system of equations;

solving the system of equations into a second set of meshes, wherein the contours of the second meshes correspond to the pattern in the second size; and representing the contours of the second set of meshes.

As a first step, the representation step, a pattern comprising one or more panels in a first size is represented. This first size is, for example, a standard size such that the panels may be sewed together into a garment corresponding to this standard size. Each of the panels comprises a 2D closed domain which are enclosed by a contour. Thus, each of the contours are represented in, for example, a CAD system, by graphic software or any other system suitable to visually represent the panels on a display. Next, a contour may further be subdivided into one or more segments. A segment is thus a portion or part of a contour, or when a contour only comprises one segment, said segment corresponds to said contour.

Next, in a second step, the constraint step, constraints are imposed on the panels. More in particular, the constraints are imposed to segments of panels. The constraints are determined by the second size into which the pattern is graded. This second size is, for example, a custom-made size or another standard size different from the first size. Besides the custom-made size, the constraints may be further determined by the type of garment to which the pattern relates.

When grading a pattern of a shirt, a constraint may, for example, be a circumference of a neck which is imposed on a contour corresponding to this circumference.

Subsequently or simultaneously, a mesh is generated of each panel of the one or more panels. A mesh comprises polygons, such as, for example, triangles or any other shape suitable for meshing a 2D domain. Each mesh approximates the 2D domain of a panel and as a result, a first set of meshes each corresponding to a panel is generated.

Then, in a subsequent step, the first set of meshes and the imposed constraints are combined. This is, for example, performed by imposing the constraints on sides of polygons of the mesh corresponding to the initial segments prior to the generation of the meshes. Alternatively, the constraints are transformed to mathematical constraints which are applied to the polygons of the mesh. Anyhow, the combining of the first set of meshes and the constraints leads to an extended system of equations. Through the combination, within the set, the equations are mutually dependent.

Differently formulated, the first set of meshes may be presented as a first system of equations, while the same accounts for the constraints which may also be presented as a second system of equations, for example, by mathematical constraints. These both first and second sets are then combined into another set comprising the latter two.

Alternatively, the meshes are presented by a set of equations on the coordinates of vertices of the mesh, such as a matrix. By imposing, in addition, the constraints, an extended system corresponding to the system of equations wherein the meshes and the constraints are combined, is obtained.

Further, this set of extended equations is solved, for example, by the use of Newton iterations in combinations with Gaussian elimination to solve the Jacobian systems or any other algorithm suitable for solving a system of equations. As a result, a solved system of equations is obtained, which on its behalf corresponds to a second set of meshes. This second set of meshes thus meets the constraints initially imposed to the first set, and corresponds to the pattern in the second size. Finally, the contours of this second set of meshes is represented, which are the panels of the pattern in the second size.

Since no grading rules are applied, it is an advantage that the method is applicable to any type of garment, thus also when grading rules are absent. Furthermore, there are no limitations on the second size, thus the custom-made size. Next, by applying the constraints directly on the contours or a part thereof, inconsistencies are avoided since the contours itself are immediately adapted to the constraints. Also, the method is not limited to experienced tailors, but may be used by any type of user. Finally, there is no need to transform the pattern to a 3D environment and back again to a 2D environment, which allows to perform the grading in a fast and efficient manner.

According to an embodiment, the contours of the second set of meshes are approximated by parametric curves.

Since the solved system of equations corresponds to the second set of meshes, this latter set of meshes is represented by a set of polygons, for example triangles. By approximating the contour or outline of this second set of meshes by parametric curves, the one or more in the second size in represented in a smoother manner. This allows to more efficiently duplicate these contours on a fabric.

According to an embodiment, the first representation step further comprises representing a panel by one or more characteristic points connected by one or more segments of its respective contour; and the constraint step further comprises imposing one or more constraints on one or more characteristic points for grading to the second size.

Segments of a contour are thus bounded by characteristic points, which, for example, depend on the type of garment. For example, again when grading a pattern suitable for fabricating a shirt, characteristic points are neck points which, by imposing a constraint, are positioned at a predefined distance away from each other when grading. Thus, by imposing constraints on characteristic points, whether or not combined with constraints on contours or segments thereof, the flexibility and possibilities are increased.

According to an embodiment, the contours of the one or more panels are represented by parametric curves comprising the characteristic points.

The parametric curves are, for example, Bezier curves wherein the characteristic points correspond to begin and/or end points of the Bezier curves and control points are chosen such that the contour makes the correct angles near the characteristic point. A general vector graphics representation is also suitable. In this way, the contours are represented in an efficient manner.

According to an embodiment, the first representation step further comprises representing a grain line within a domain of a panel; and the constraint step further comprises imposing a constraint on the grain line.

Prior to cutting out a panel out of a piece of fabric, the contour of the panel is duplicated on said fabric. Yet, it may be important in which rotational direction the contour is duplicated on said piece of fabric, especially if the fabric is anisotropic. A fabric may, for example, be woven in such a way that it is more extendible in one direction compared to another one, for example, perpendicular hereupon. When, for example, a panel needs to have more extendibility in a one direction, this is presented by a grain line. Thus, given the possibility of representing a grain line and next imposing a constraint on the grain line, for example that is has to remain a straight line, the grading is performed while satisfying this requirement.

According to an embodiment, the first representation step further comprises a dart within a domain of a panel; and the constraint step further comprises imposing a constraint on a dart.

A dart may be present at the outside of a panel and thus represented by a contour. Additionally, a dart may also be present in the closed 2D domain of a panel. The 2D domain thus has a hole inside which represents the dart. Consequently, also on the represented dart constraints may be imposed on order to satisfy to the requirements when draping.

According to an embodiment, the representation step further comprises representing a decorative element within a domain of a panel; and the constraint step further comprises imposing a constraint on the decorative element.

A fabric from which panels are cut out may comprises decorative elements. A similar reasoning as for the grain line is thus applicable, meaning that the rotational direction by which a contour is drafted in the fabric is vital. Thus, by representing a decorative element within a domain of a panel corresponding the decorative element of the fabric, the rotational direction is taken into account. In this way, when sewing the panels into a garment, the decorative elements will be represented in a desired direction when the garment is worn.

According to an embodiment, a constraint comprises at least one of the group of:
  a seam constraint when imposing at associated segments ensuring that said associated segments remains equally sized;
  a straight-line constraint;
  a distance constraint;
  a length constraint;
  an angle constraint; and
  an inequality constraint.

The panels of the pattern are sewed together to fabricate the garment. Regardless of the size, over different panels there are thus contours or segments thereof that needs to be equally sized to sew the garment in a practicable manner. A seam constraint is thus imposed on these corresponding contours or segments. Several pairs of corresponding contours between panels may be present. The seam constraint then ensures that these contours remains equally sized and that they correspond in shape such that a sewing operation is possible.

A straight-line constraint ensures that the line whereupon the constraint is imposed, remains straight when transforming the panel from the first to the second size. Hence, the straight-line constraint is, for example, imposed on a grain line and/or on a decorative element or any the contour or segment thereof that needs to remain straight after the grading of the pattern.

A distance constraint ensures that a predefined Euclidean distance is imposed. For example, between two characteristic points or between two segments, a predefined distance is imposed when these points or segments need to be positioned at a predefined distance in the pattern in the second size. As for segment, the imposing may, for example, be imposed on the middle thereof.

A length constraint is imposed on a contour or a segment thereof and ensure that said contour or segment will have a predefined length when grading to the second size. For example, a length constraint may be imposed for a circumference of a neck.

An angle constraint ensures that a predefined angle is retained when grading. This may, for example, be imposed at a characteristic point.

An inequality constraint ensures that a panel is cuttable after grading. In order to ensure this, it is prevented that polygons of the mesh of a panel overlap with each other. This is obtained by expressing the constraint as an inequality or non-overlapping constraint, wherein the inequality remains positive as long as a polygon does not overlap with another one.

According to an embodiment, the solving comprises minimizing a deformation energy of the second set of meshes with respect to the first set of meshes.

When solving the system of equations into a second set of meshes, there may be several meshes which meet the requirements imposed by the constraints. By minimizing the deformation energy of the second set of meshes with respect to the first set, it is ensured that a mesh out of the possible one is calculated and identified that meets said constraints in the most optimal manner. This is, for example, achieved by minimizing a distance based on a distortion cost or a deformation energy.

Alternatively, the solving is based on morphing the first set of meshes into the second set of meshes. In this way, the second set of meshes may be computed in a fast way.

According to a second aspect, the disclosure relates to a data processing system programmed for carrying out the method according to the first aspect.

According to a third aspect, the disclosure relates to a computer program product comprising computer-executable instructions for performing the method according to the first aspect when the program is run on a computer.

According to a fourth aspect, the disclosure relates to a computer readable storage medium comprising the computer program product according to third aspect.

DETAILED DESCRIPTION OF EMBODIMENT(S)

Figure 1:
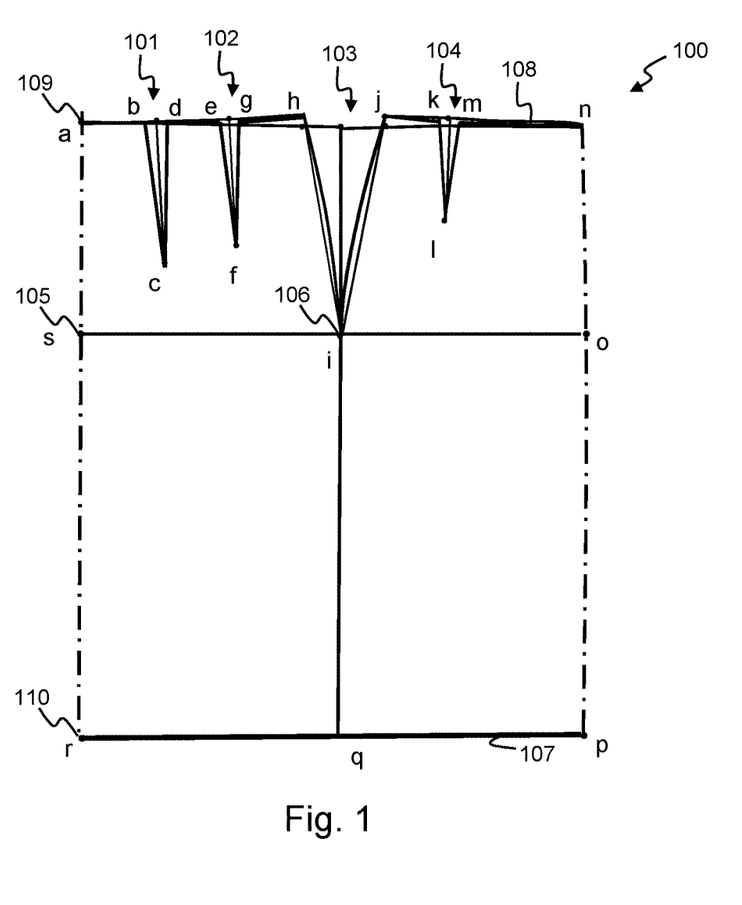
FIG. 1 illustrates a design draft of a pattern of a skirt.

FIG. 1 illustrates a design draft of a pattern of a skirt in a first size. Generally, a designer or tailor drafts such a design draft 100 on, for example, a sheet of paper. The design draft 100 illustrates a pattern suitable for fabricating a skirt. More in particular, the pattern illustrates a panel of half of the front and half of the back of the skirt when fabricating. Thus, a duplicate of the panel is needed in order to fabricate a full skirt. In the further continuation one panel of the pattern 100 is represented, but it should be obvious that the pattern 100 comprises 2 panels to fabricate the skirt.

The design draft 100 comprises a plurality of lines and curves, such as 107 and 108. Furthermore, the draft 100 is supplemented by a set of characteristic points, such as 105, 106, 109 and 110, and identified by characters. These characteristic points may indicate points corresponding to lengths on a body when worn. For example, the distance between point a 109 and point s 105 indicate a hip height, while the distance between points a 109 and r 110 is the length of the skirt. Characteristic points may further be marked on angles, such as point i 106, for the purpose of visibility when, for example, subsequent design drafts are made.

The lines or curves indicate how to cut out the panel out of a fabric. Line 107, for example, corresponds to the bottom of the skirt, while curve 108 is a part of the top side. The panel of the pattern 100 further comprises a set of darts 101-104. These darts are needed to have a fit around the waist and the hip of a body.

Figure 2:
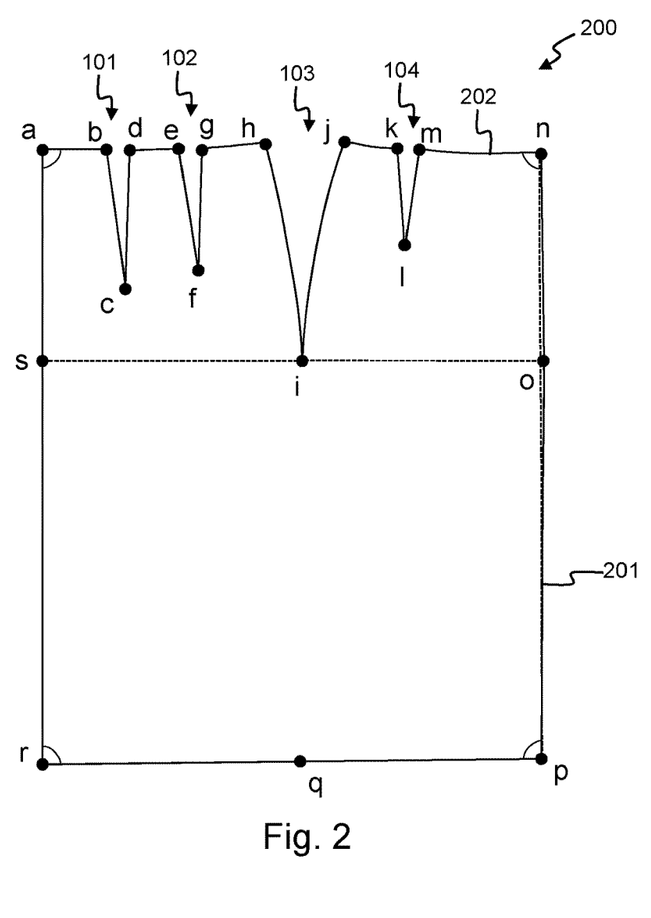
FIG. 2 illustrates the pattern of FIG. 1 represented by parametric curves and characteristic points according to an embodiment of the invention.

This initial design draft 100 is in a subsequent step represented by a set of parametric curves and points, as illustrated in FIG. 2. In other words, the draft 100 is now represented by straight lines, for example 201, by characteristic points and parametric curves, such as 202, in pattern 200. The parametric curves, such as 202, are, for example, Bézier curves. The parametric curves form a closed loop that describes the outline of a panel of the pattern. Additionally, loops are present as well that describe, for example, darts inside a domain. Furthermore, an additional line may be present in the inside of a domain of a panel to describe a grain line. The characters are copied such that it remains clear what initially is intended.

Figure 3:
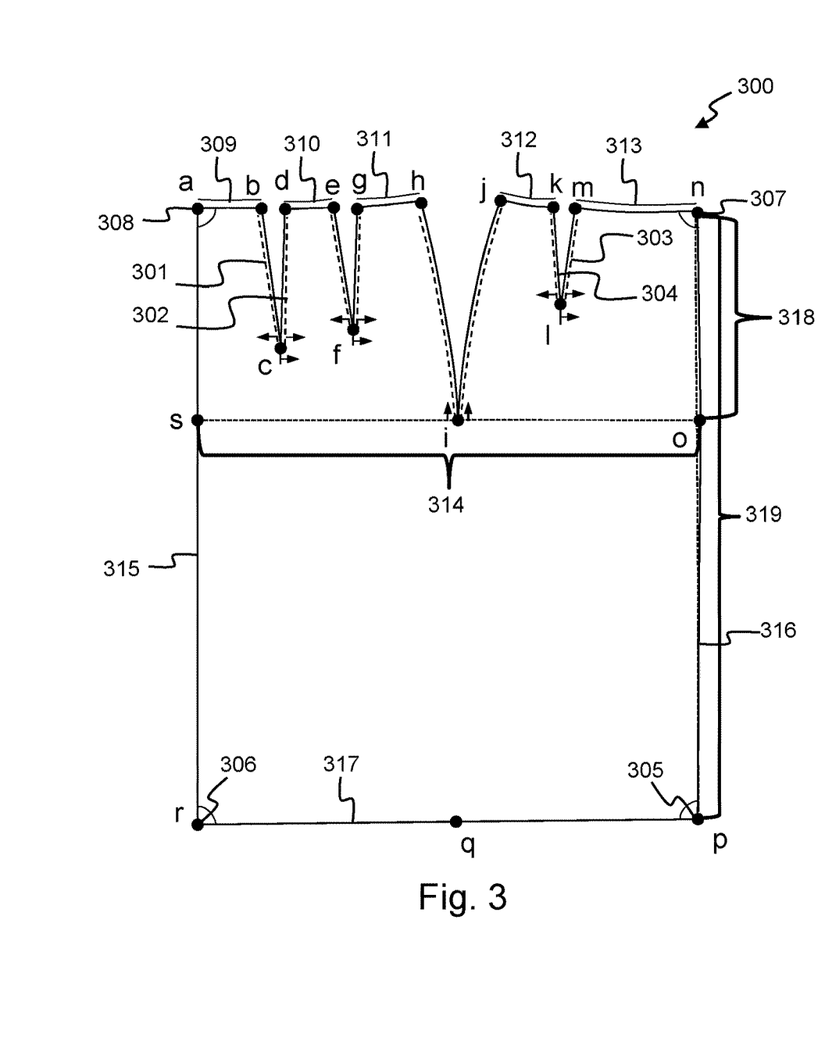
FIG. 3 illustrates the pattern of FIG. 2 annotated with constraints according to an embodiment of the invention.

This pattern 200 is now suitable to be annotated, as illustrated in FIG. 3 by annotated pattern 300.

Since the initial pattern 100 is suitable to fabricate a skirt, several constraints need to be imposed, which are, among others, dependent on, for example, a hip height, a hip circumference and a desired length of the skirt. The constraints are thus imposed on characteristic points and/or lines or curves of the pattern. These constraints are each of equally importance, meaning that the following enumeration does not indicate any hierarchical structure amongst them.

Firstly, for each of the darts 101-104 seam constraints are imposed. When the panel is cut out of a fabric, the darts are stitched or sewed together. This implies that, for example for dart 101 the length of the contour between points b and c should be the same as the length of the contour between points d and c. For dart 101, two seam constraints are thus imposed, namely seam constraint 301 and seam constraint 302, such that the length remains equal when the pattern 300 is graded. The same seam constraints accounts for the contours between points e-f and g-f; for the contours between points h-i and j-i and for the contours between points k-1 and m-1 illustrated by seam constraint 304 respectively 303.

Secondly, angles constraints are imposed in each corner of the pattern 300, namely in points a 308, r 306, p 305 and n 307. The angles are, for example, enforce to 90° angles between the lines that arrive at these points. In point r 306, two straight lines arrives 305 and 317, so the angle constraints of 90° is straightforward. In point a 308 a straight line 315 as well as a curve 320 arrives. Here, the angle constraint of 90° is to be regarded as the angle between the straight line 315 and the tangent of the curve 320 arriving in point a 308.

Next, length constraints are imposed as well. The sum of the length of the contours between points a-b, d-e, g-h, j-k and m-n needs to correspond to half of the waist length of a target person. These constraints are illustrated by 309-313.

Furthermore, besides a length constraint, a distance constraint is imposed as a well. The distance constraint imposes a Euclidian distance between two characteristic points. The distance between points s and o corresponds to half of the hip circumference of the target person. For reasons of comfort, an ease may be added to this Euclidian distance and imposed between these to points, as illustrated by 314. Additionally, the distance between points n and o corresponds to the hip height of the target person. Again, this height is imposed as a distance constraint and illustrated by 318. Finally, the distance between point n and point p corresponds to the length of the skirt and is imposed as well 319.

Straight-line constraints are imposed as well. In the panel of the pattern 300, the lines between points a-r, between r-p and between n-p need to be straight, and thus straight-lines constraints are imposed, illustrated by 315, 317 respectively 316.

Figure 4:
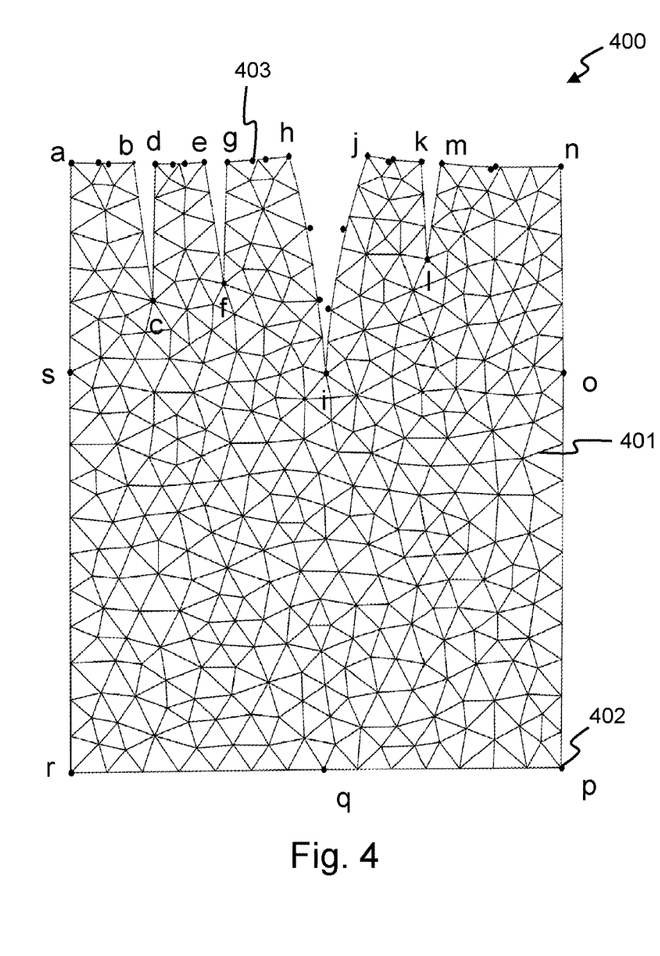
FIG. 4 illustrates the pattern of FIG. 2 discretized using triangles according to an embodiment of the invention.

In a subsequent step, a mesh is generated of panel 200. This is illustrated in FIG. 4 by the meshed panel 400. This illustration further comprises control points of parametric curves, such as point 403. In this step, triangles are used to generate the mesh, as illustrated by triangle 401, but another polygon mesh is applicable as well. A mesh comprises a set of vertices V with $(u, v) \in \mathbb{R}^2$ and a set of edges E that indicate which vertices from the set V are connected. Thus, each triangle is made up from three vertices and three edges. With two edges that meet in a vertex, an angle is associated, meaning that a triangle comprises three angles denoted as $(\delta, \in, \zeta) \in \mathbb{R}^3$. Furthermore, for each characteristic point, the triangles are defined in such a way that the characteristic points correspond to vertices of one or more triangles, as illustrated by point 402.

In other words, the characteristic points are vertices of particular triangles. The labels of the characteristic points are copied as well. Further, for purpose of illustration, a coarse mesh is represented, but it should be clear that finer triangulations may be used as well.

The mesh is now represented by their vertices and corresponding coordinates. Next, this is transformed to a representation of the angles of each of the triangles, or, in other words, the angles are derived from the coordinates of the vertices and edges that form each triangle using the law of cosines. The cosine rule derives the angle based on the length of the edges that makes up the triangle. The inverse operation is also possible, namely given the angles $\delta, \in$ and $\zeta$ of a triangle with corners $(u_1, v_1)$, $(u_2, v_2)$ and $(u_3, v_3) \in \mathbb{R}^3$, the relation becomes:

$$\left[\begin{pmatrix}u_3\\v_3\end{pmatrix}-\begin{pmatrix}u_1\\v_1\end{pmatrix}\right]=\frac{\sin(\epsilon)}{\sin(\zeta)}\begin{pmatrix}\cos\delta & \sin\delta\\-\sin\delta & \cos\delta\end{pmatrix}\left[\begin{pmatrix}u_2\\v_2\end{pmatrix}-\begin{pmatrix}u_1\\v_1\end{pmatrix}\right], \quad \text{(Eq. 1)}$$

which is based on the law of sines and the rotation matrix that rotates one edge into the other edge over an angle δ.

Equation 1 is rewritten as a system of equations for each of the coordinates of the vertices that belong to a triangle:

$$\begin{pmatrix}-1+\frac{\sin\epsilon}{\sin\zeta}\cos\delta & \frac{\sin\epsilon}{\sin\zeta}\sin\delta & -\frac{\sin\epsilon}{\sin\zeta}\cos\delta & -\frac{\sin\epsilon}{\sin\zeta}\sin\delta & 1 & 0\\ -\frac{\sin\epsilon}{\sin\zeta}\sin\delta & -1+\frac{\sin\epsilon}{\sin\zeta}\cos\delta & \frac{\sin\epsilon}{\sin\zeta}\sin\delta & -\frac{\sin\epsilon}{\sin\zeta}\cos\delta & 0 & 1\end{pmatrix}\begin{pmatrix}u_1\\v_1\\u_2\\v_2\\u_3\\v_3\end{pmatrix}=\begin{pmatrix}0\\0\end{pmatrix}. \quad \text{(Eq. 2)}$$

Equation 2 is a system of equations comprising six unknowns with two conditions. Given the coordinates of two points, i.e. four known variables, the coordinates of the third point are determined by solving the system of equations for the remaining coordinates. This condition is repeatedly expressed for each triangle in the mesh leading to the system of equations expressing to mesh. Denoting all the angles of all m triangles with a vector $\alpha \in \mathbb{R}^{3m}$ and the coordinates of all vertices with a vector $x \in \mathbb{R}^{2n}$, the set of equations is formulated as a matrix equation $B(\alpha)x=0$, where $B(\alpha)$ is an 2m by 2n matrix, where m is the number of triangles and n is the number of vertices. In 2D one has, in general, m=n−2. Hence, this matrix equation expresses the relation between the coordinates of the vertices and the angles of the triangles that make up the triangulation.

In order to uniquely define the transformation between angles and coordinates, the four remaining unknowns need to be specified, corresponding to the coordinates of two points. Without loss of generality, a vertex is picked, and its coordinates are set to zero, namely $(u_i, v_i)=(0,0)$. This corresponds to a translation of the mesh until $(u_i, v_1)$ lies in the origin. A second point may be chosen to lie in $(u_j, v_j)=(0, \rho)$. This corresponds to a rotation and scaling of the mesh by a factor such that vertex j arrives in this point.

The system of equations may now be extended by adding four rows at the top of the matrix, each with a single non-zero element that is set to one. One row has a non-zero at 2i, a second row has a non-zero at 2i+1. Similarly, the third and the fourth row have a non-zero at 2j and 2j+1. Next, a right-hand side ρb is added to the system of equations, where b is a vector of length 2m that is zero everywhere except the fourth element that is set to one. This results in the square system of equations:

$$A(\alpha)x = \begin{pmatrix}0 & \ldots & 1 & 0 & \ldots & 0 & 0 & \ldots\\ 0 & \ldots & 0 & 1 & \ldots & 0 & 0 & \ldots\\ 0 & \ldots & 0 & 0 & \ldots & 1 & 0 & \ldots\\ 0 & \ldots & 0 & 0 & \ldots & 0 & 1 & \ldots\\ & & & B(\alpha) & & & &\end{pmatrix}\begin{pmatrix}x_0\\y_0\\\vdots\\x_i\\y_i\\\vdots\\x_j\\y_j\\\vdots\end{pmatrix}=\begin{pmatrix}0\\0\\0\\\rho\\0\end{pmatrix}=\rho b. \quad \text{(Eq. 3)}$$

In short, the system of $A(\alpha)x=\rho b$ is non-singular and allows to uniquely describe the mesh by a scaling factor ρ and α, the angles of all triangles.

When there are multiple panels in the pattern, for each of the panels holds $A(\alpha^p)x^p=\rho^p b$, where the superscript indicates that $\alpha^p$ are the angles of the panel p and $x^p$ are coordinates of the corresponding vertices.

Now, the pattern is represented as a mesh, whereas the 401 is formulated as a set of equations, more in particular a set of vertices or a set of angles and scaling factors.

Next, the annotated panel 300 is next combined with the meshed panel 400, and thus with the set of equations. Differently formulated, the constraints of panel 300 are enforced on the mesh 400 by translating the constraints in equalities or inequalities and further combined with the set of equations. The combination will be illustrated by a detailed view of the meshed panel 400 in FIG. 5. The detailed view 500 of the meshed panel is a zoom of the upper left corner of panel 400.

Figure 5:
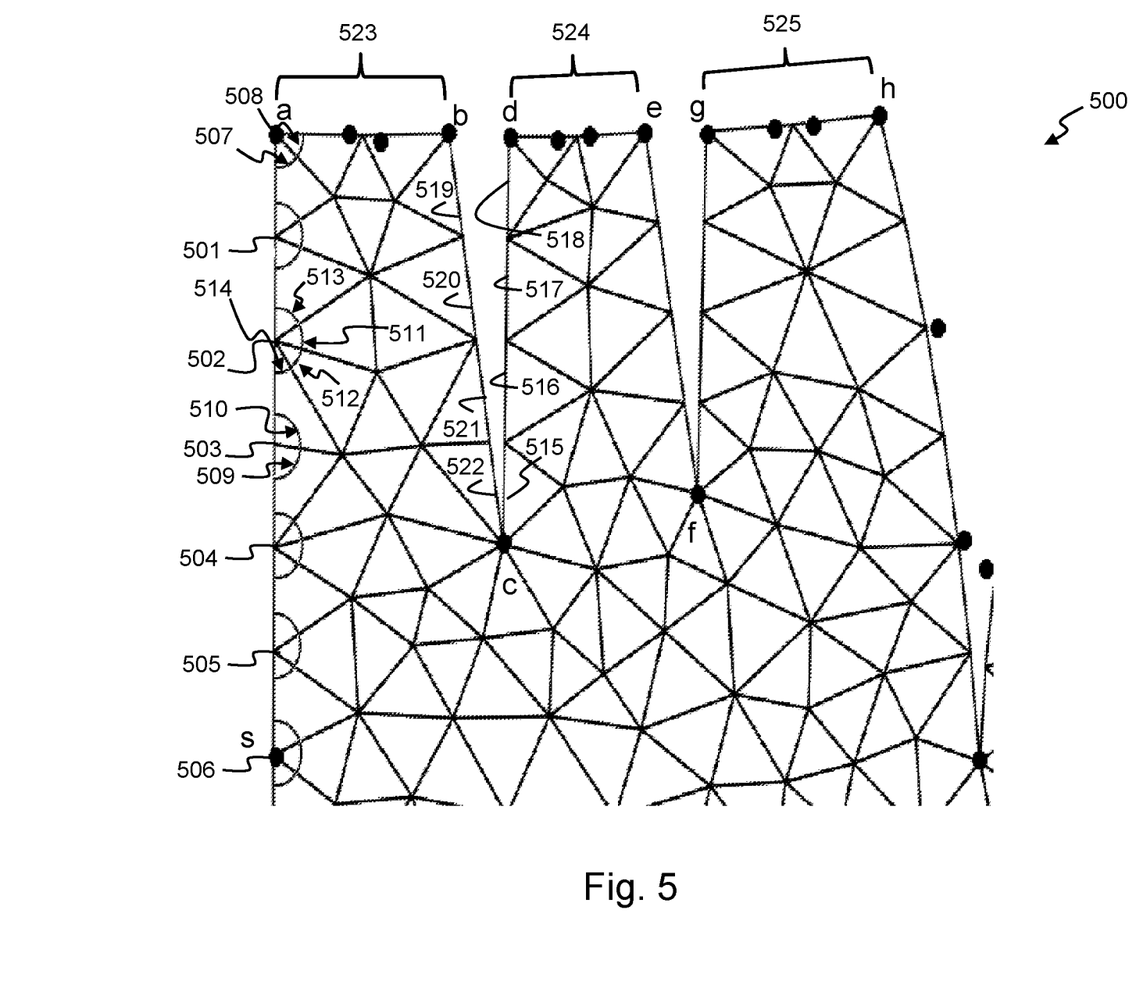
FIG. 5 illustrates a detailed view of the discretized pattern of FIG. 4 according to an embodiment of the invention.

Near the corner of point a 308 the angle constraint of 90° is enforced on the triangles that meet in point a 308. In this mesh, the vertex in point a is part of two triangles. Therefore, the sum of the two angles 507 and 508 needs to equal to 90°. This is imposed as a mathematical equality constraint, and is expressed with the vector α that comprises all the angles of all triangles in the mesh of a panel. All the angle constraint may be expressed as $$c^T \alpha - \frac{\pi}{2} = 0,$$

where $c \in \mathbb{R}^{3m}$ is a vector comprising either zeros or ones. These ones are positioned at the indices of the particular angles that are involved in the angle constraints.

The straight-line constraint imposed at the line from point a to point r is enforced on vertices of triangles adjacent to the line. In other words, in the detailed view 500, the said vertices are vertices 501-506. Other vertices which are not represented in the detailed view of 500 are intended as well. The straight-line constraint is imposed by requiring that for each of the vertices along the line the sum of the angles is 180°. Thus, in each of the vertices 501-506 this sum is enforced. For each point a different number of angels may be present. For example, in vertex 502 four angels are present, namely 511-514, while in vertex 503 two angles are present, namely 509-510. The straight-line constraint thus enforces that the sum of angels 511-514 equals 180° as well as for the angles 509-510. Mathematically this is translated in enforcing multiple angle constraints wherein on each vertex along the straight line, the sum of the angles around a vertex equals Tr.

The seam constraints are as well translated to the mesh 400. This is illustrated in a detailed view in FIG. 5 by the seam constraint imposed at dart 101 comprising points b, c and d. The sum of the lengths of the sides of the four triangles that describe the outline between points b and c 519-522 need to be the same as the sum of the lengths of the sides of the triangles between the points d and c 515-518. A similar reasoning applies for the dart e-f-g.

Thus, the seam constraint defines an equality between two segments of the contour, for example, the segment between points b and c and a segment between points d and c. In this example, the segment are located within one panel, but an equality may also be imposed between two segments located in two different panels. Assuming that two segments whereupon a seam constraint is imposed are located within panel $p_1$ respectively $p_2$, an equality of lengths of the seams is expressed as $$\sum_{(i,j) \in S^{P1}} \sqrt{(u_i^{p1} - u_j^{p1})^2 + (v_i^{p1} - v_j^{p1})^2} - \sum_{(k,l) \in S^{P2}} \sqrt{(u_k^{p2} - u_l^{p1})^2 + (v_k^{p2} - v_l^{p1})^2} = 0, \quad \text{(Eq. 4)}$$

wherein (i, j) and (k, l) define an edge between vertices i and j respectively k and l. The sets $S^{p1}$ and $S^{p2}$ define a set of adjacent edges between vertices that make up a segment of the contour on panel $p_1$ respectively a segment of the contour of panel $p_2$.

The length constraint, illustrated by 309-313, imposed on the waist band are described by a sum of lengths of sides that approximate the waist band, further illustrated by 523-525, which is a part of said waist band. For example, between points a and b there are two edges of two triangles. The same account for the segment between points d-e and g-h. The sum of the lengths of the edges between points a-b, d-e, g-h, j-k and m-n is imposed to be equal to give half of a waist length. A length constraint is expressed as a sum of lengths of edges of the triangulation, or $$\Sigma_{(i,j,p) \in s} \sqrt{(u_i^P - v_j^P)^2 + (u_i^P - v_j^P)^2} - l = 0, \quad \text{(Eq.5)}$$

where S is a set of edges of vertices defined by the vertices where they start and end and the corresponding panel p. These edges are not necessarily adjacent or on a same panel. The sum is equal to the desired length l as imposed by the length constraint.

A seam constraint, a length constraint, an angle constraint and a straight-line constraint are either enforced on angles in vertices or on lengths along edges of the triangles.

Figure 6:
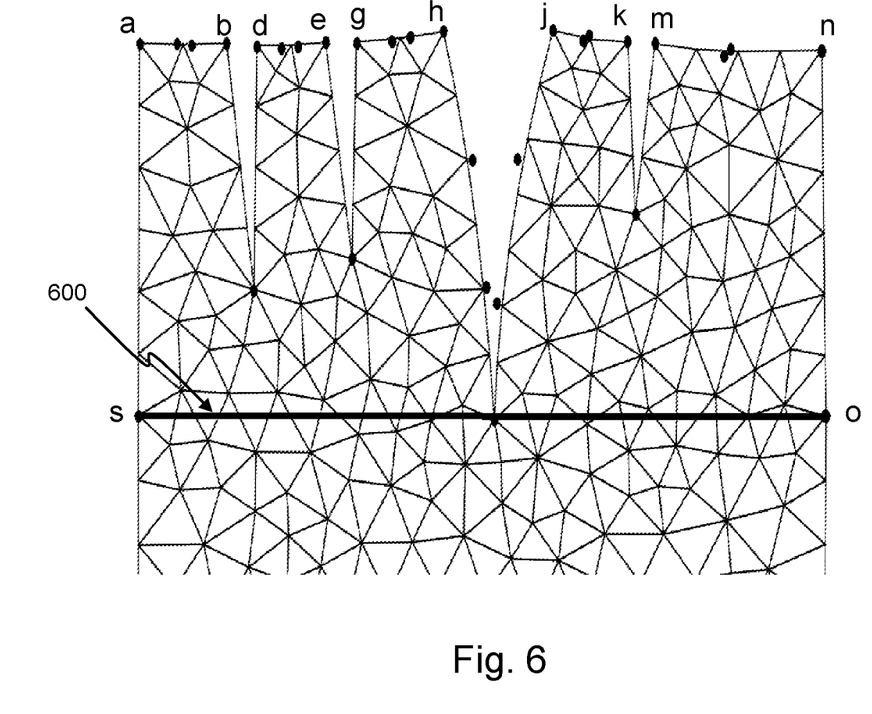
FIG. 6 illustrates a distance constraint imposed on the pattern of FIG. 2 according to an embodiment of the invention.

A distance constraint is illustrated in FIG. 6 and, in contrast to the just listed constraints, a distance constraint does not take into account polygons, in this case triangles. A distance constraint is directly enforced by an Euclidian distance between characteristic points, for example point s and point o illustrated by line 600, without reference to the mesh between these two points s and o. Mathematically, a distance constraint is imposed as $$\Sigma_{(i,j,p)} \sqrt{(u_i^P - u_j^P)^2 + (v_i^P - v_i^P)^2} = d, \quad \text{(Eq.6)}$$

wherein the points i and j are positioned on panel p and do not to be connected through an edge of triangulation. As expressed in Equation 5, constraints may also be compounded over multiple panels.

In order to prevent a panel from being uncuttable from a single piece of fabric, an inequality constraint may be imposed as well. An inequality constraint, also denominated as an overlap constraint, prevents that triangles start to overlap with each other when solving the set of equations. In particular, when a pattern comprises darts, such as 101-104, such an inequality constraint is imposed. An inequality constraint prevents the vertices of the outline of the mesh t enter another polygon, in this case a triangle. Thus, for each vertex, a distance to a nearest triangle is calculated, except for adjacent triangles. As a result, an inequality condition is expressed, which is positive when the mesh is valid according to the constraint and becomes negative when a vertex enters another polygon. Hence, for all vertices on the boundary of a mesh of a panel, the inequality condition needs to be positive or at least equal to zero.

Next, all the constraints are expressed as a set of equality and inequality conditions that either depend on the coordinates of the vertices, for example as for the length constraints, or on the angles of the triangles, for example for the angle constraints. Since every coordinate of a vertex may be written implicitly as a function of $\rho$ and $\alpha$ as expressed in Equation 3, all the imposed constraints may be expressed as a function of $\rho$ and $\alpha$, or $c_i(\rho, \alpha) = 0$ for all $i \in \varepsilon$, where $\varepsilon$ is the set of equality constraints and $c_i(\rho, \alpha) \geq 0$ for all $i \in \mathcal{J}$, where $\mathcal{J}$ is a set of inequality constraints.

Finally, the mesh and the constraints are combined. The mesh, or in a particular case a triangulation, as illustrated in FIG. 4 in a first size, is next transformed as a result of the constraints to a second size, while the shape of panels in the second size corresponds to those in the first size. The latter condition is straightforward, since the panels corresponds to a same garment.

A corresponding shape is obtained by allowing consistent variations in the angles $\alpha^p$ and the scaling factors $\rho^p$, for each of panels p. Thus, let $(\rho(1)^p, \alpha(1)^p)$ the factors that describe the garment in the first size of a garment and $(\rho(2)^p, \alpha(2)^p)$ the scaling and the angles factors of the garment in the second size. A possible way to define a deformation energy between the garment in the first size and the garment in the second size is through a sum of square differences in angles, or $$E = \sum_p \sum_i \frac{(\alpha(1)_i^p - \alpha(2)_i^p)^2}{s_i^p}, \quad \text{(Eq. 7)}$$

wherein $s_i^p$ is the size of the surface area of the triangle to which the angle $\alpha_i$ belongs. The sum runs over all panels and all angles of each of these panels.

Next, an optimal garment as the pattern in the second size is defined as the solution of the following constrained optimization problem:

$$\min_{\rho^p, \alpha^p} \sum_p E(\alpha^p) \quad \text{(Eq. 8)}$$

$$\text{s.t.} \quad c_i(\rho, \alpha) = 0 \text{ for all } i \in \varepsilon,$$

$$c_i(\rho, \alpha) \geq 0 \text{ for all } i \in \mathcal{J},$$

wherein $E(\alpha^p)$ is the deformation energy of panel p. This constrained optimization problem selects from a family of possible meshes that satisfy all the constraints that particular pattern with the minimal deformation energy with respect to the pattern of the first size. By only looking at the angles, it is insensitive to simple resizing of the object, which does not alter the shape.

Figure 8:
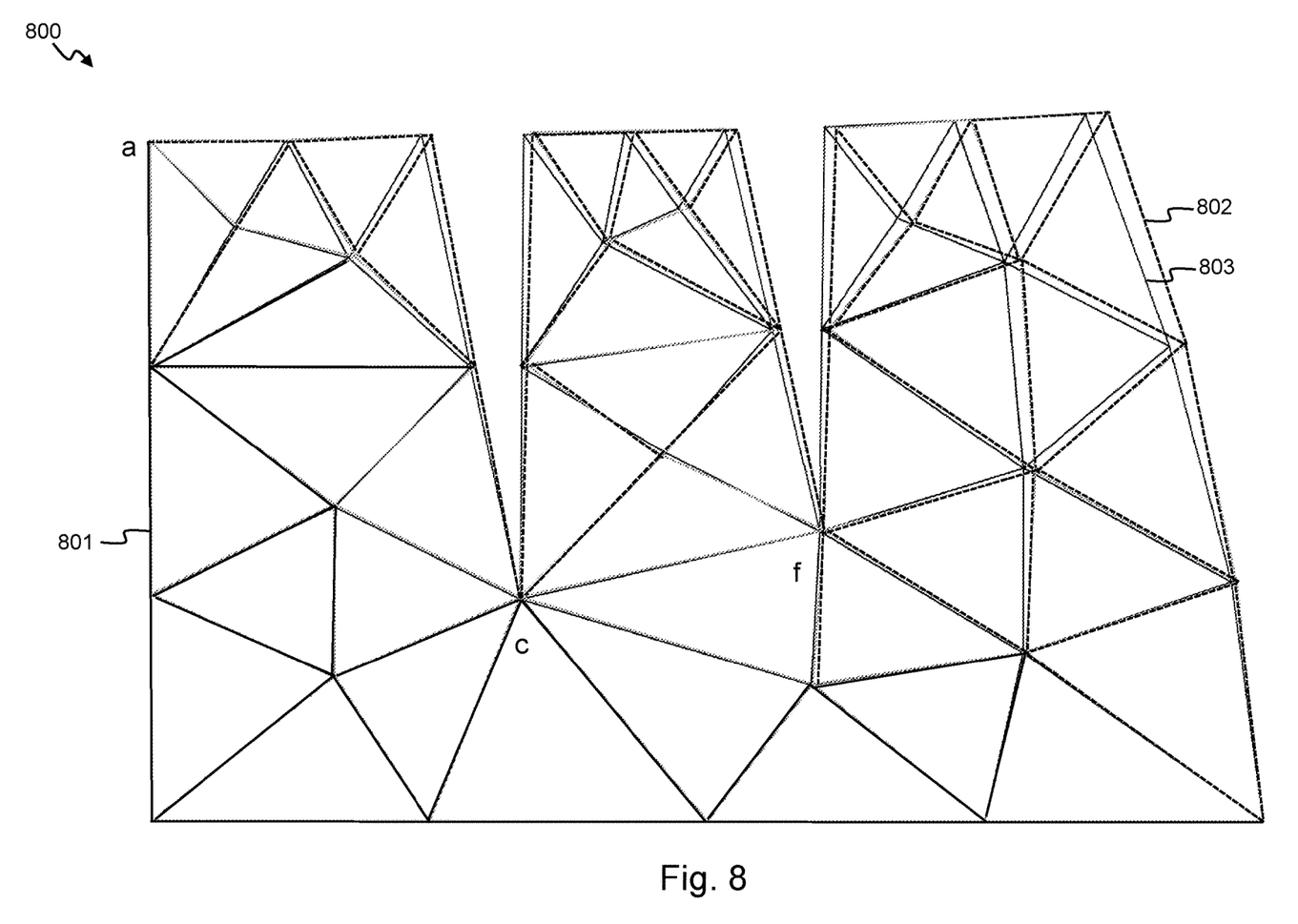
FIG. 8 illustrates a detailed view of a deformed mesh in a second size according to an embodiment of the invention.

Subsequently, the constrained minimization problem is solved with techniques of numerical optimization. First order optimality conditions, known as Karush-Kuhn-Tucker conditions, lead to the following system of equations, formulated for a single panel:

$$\frac{\partial E(\alpha, \rho)}{\partial \alpha} - \sum_{i \in \varepsilon \cup \mathcal{J}} \lambda_i \frac{\partial c_i(\rho, \alpha)}{\partial \alpha} = 0, \quad \text{(Eq. 9)}$$

$$\sum_i \lambda_i \frac{\partial c_i(\rho, \alpha)}{\partial \rho} = 0,$$

$$c_i(\rho, \alpha) = 0 \text{ for all } i \in \varepsilon,$$

$$c_i(\rho, \alpha) \geq 0 \text{ for all } i \in \mathcal{J},$$

$$\lambda_i \geq 0 \text{ for all } i \in \mathcal{J},$$

$$\lambda_i c_i(\rho, \alpha) = 0 \text{ for all } i \in \mathcal{J},$$

where the latter condition is the complementarity condition. The system is solved with, for example, interior point methods, which is similar to Newton iterations complemented with step size control to maintain feasibility and proximity to a central path. Each iteration a Jacobian system is solved based on Gaussian elimination for sparse linear systems. As a result, the solved system corresponds to a mesh in the second size, as illustrated in FIG. 8. Line 801 corresponds to a triangle in the first and second sizes, while as for 802 and 803, triangles are illustrated in the second 803 respectively first 802 size.

Figure 7:
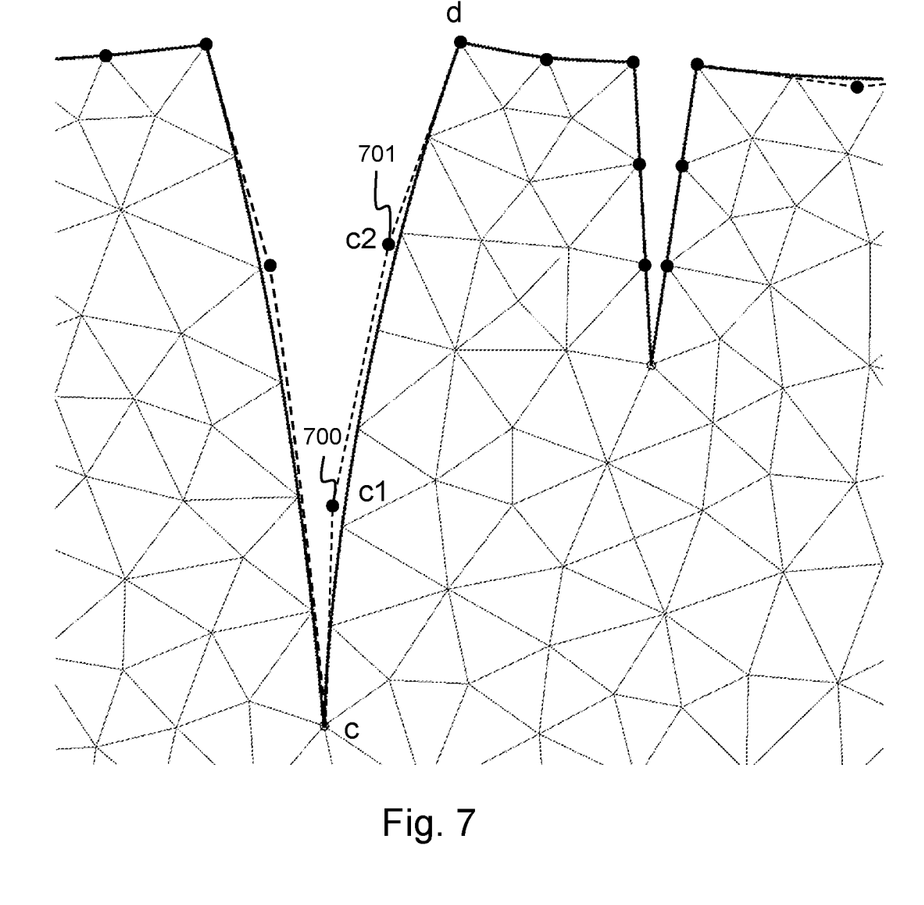
FIG. 7 illustrates the fitting of parametric curves on a mesh according to an embodiment of the invention.

Since the initial mesh is generated based on a set of parametric curves that describe the shape of the panels of the pattern, in a final step, thus after optimization of the mesh, a representation is given of the outline of the meshes of each panel in the second size, again by the use of parametric curves. This is illustrated in FIG. 7.

The start and end points of the parametric curves that describe the original pattern are vertices of the mesh that approximates this pattern. After the optimization in the second size, the new coordinates of the start and end points are known. Thus, a final step, is to fit parameters of parametric curves such that the new curve approximates the outline of the optimized new mesh. For example, for a curve between points c and d in FIG. 7, a Bézier curve is illustrated where, besides its start points d and end point c, two control points c1 700 and c2 701 describe the parametric curve. Thus, by denoting $x_i$ vertices of a mesh that form the outline of the mesh between the points c and d, an optimization problem for two control points c1 and c2 is described as $$\min_{c_1, c_2} \sum_i d(x_i, \text{curve}(c, c_1, c_2, d))$$

wherein the sum goes over the vertices of the segment between points c and d. The $d(x_i, \text{curve}(c, c_1, c_2, d))$ denotes the distance of a point $x_i$ to the parametric curve described by start point c, end point d and the control points c1 700 and c2 701. This fitting is repeated for each segment of the outline until a full representation is obtained by parametric curves for each of the panels.

Figure 9:
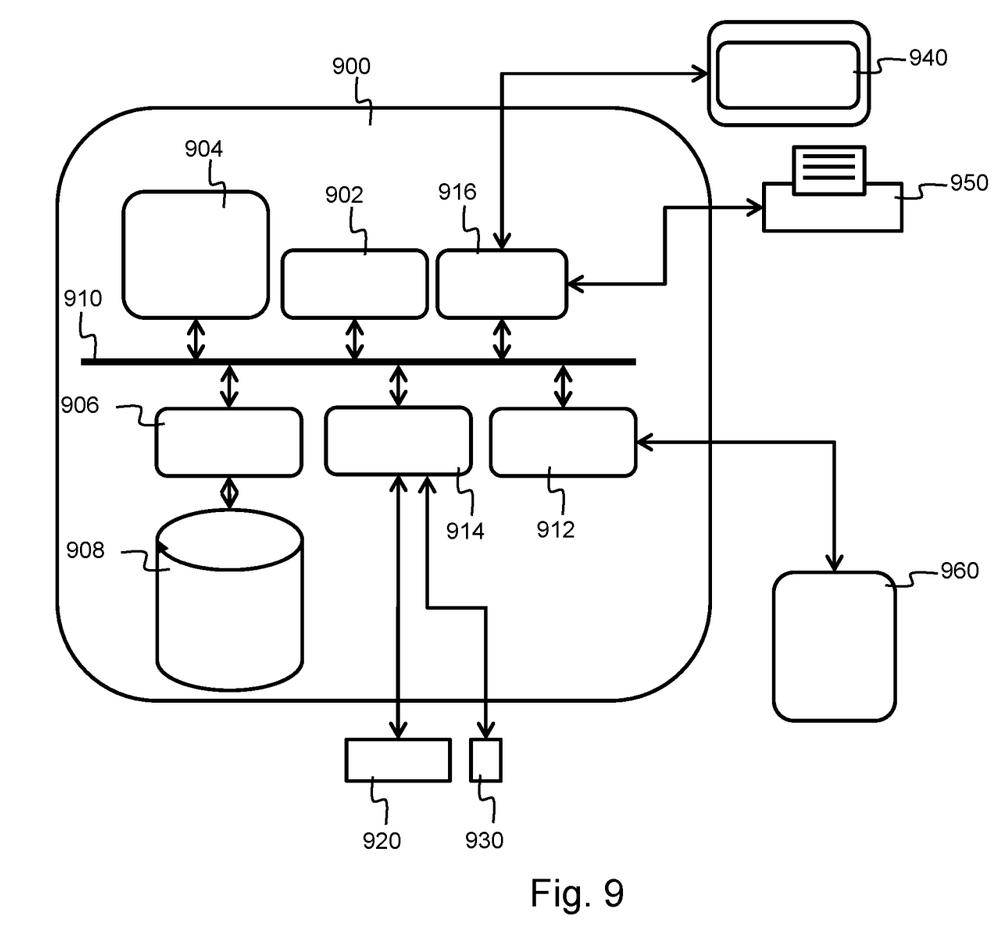
FIG. 9 illustrates a computer system that can be configured to execute one or more embodiments of the method for grading a pattern.

FIG. 9 shows a suitable computing system 900 for performing the steps according to the above embodiments. Computing system 900 may be used for grading a pattern. Computing system 900 may in general be formed as a suitable general purpose computer and comprise a bus 910, a processor 902, a local memory 904, one or more optional input interfaces 914, one or more optional output interfaces 916, a communication interface 912, a storage element interface 906 and one or more storage elements 908. Bus 910 may comprise one or more conductors that permit communication among the components of the computing system 900. Processor 902 may include any type of conventional processor or microprocessor that interprets and executes programming instructions. Local memory 904 may include a random access memory (RAM) or another type of dynamic storage device that stores information and instructions for execution by processor 902 and/or a read only memory (ROM) or another type of static storage device that stores static information and instructions for use by processor 902. Input interface 914 may comprise one or more conventional mechanisms that permit an operator to input information to the computing device 900, such as a keyboard 920, a mouse 930, a pen, voice recognition and/or biometric mechanisms, etc. Output interface 916 may comprise one or more conventional mechanisms that output information to the operator, such as a display 940, etc. Communication interface 912 may comprise any transceiver-like mechanism such as for example one or more Ethernet interfaces that enables computing system 900 to communicate with other devices and/or systems 960. The communication interface 912 of computing system 900 may be connected to such another computing system by means of a local area network (LAN) or a wide area network (WAN) such as for example the internet. Storage element interface 906 may comprise a storage interface such as for example a Serial Advanced Technology Attachment (SATA) interface or a Small Computer System Interface (SCSI) for connecting bus 910 to one or more storage elements 908, such as one or more local disks, for example SATA disk drives, and control the reading and writing of data to and/or from these storage elements 908. Although the storage elements 908 above is described as a local disk, in general any other suitable computer-readable media such as a removable magnetic disk, optical storage media such as a CD or DVD, -ROM disk, solid state drives, flash memory cards, . . . could be used. The system 900 described above can also run as a virtual machine above the physical hardware.

Figure 10:
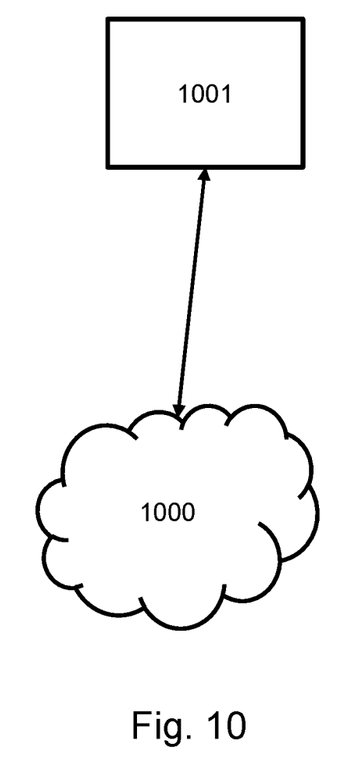
FIG. 10 illustrates a cloud-interface to execute one or more embodiments of the method for grading a pattern in the cloud.

The steps according to the above embodiments may be performed on computing system 900. Computing system may interact directly with a user, e.g. through the interfaces 920, 930 and represent the results of the steps according to the above embodiments on a display 940 or print them on a printer 950. Alternatively, as illustrated in FIG. 10, the steps may be performed remote from a user on a remote computing system 1000, e.g., on a cloud computing system. Interaction with a user may then be done by a connection between the remote computing system 1000 and a client computing system 1001, e.g. over an Internet connection. Also, the client computing system 1001 may be implemented as computing system 900. Communication is then performed over a wired or wireless networking interface 912.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer implemented method for grading a pattern suitable for fabricating a garment from a first size to a second size, the pattern comprising one or more panels, each panel comprising a two-dimensional closed domain, the method comprising:
   a first representation step comprising representing each panel of the one or more panels by a contour enclosing its respective closed domain, wherein the contour comprises one or more segments;
   a constraint step comprising imposing one or more constraints on the one or more segments of the contour for grading to the second size;
   generating a mesh of each panel of the one or more panels thereby obtaining a first set of meshes;
   combining the first set of meshes with the constraints into a system of equations;
   solving the system of equations into a second set of meshes, wherein one or more contours of the second set of meshes correspond to the pattern in the second size; and
   determining the one or more contours of the second set of meshes.

2. The computer implemented method according to claim 1, wherein the determining the one or more contours of the second set of meshes further comprises approximating the one or more contours by parametric curves.

3. The computer implemented method according to claim 1, the first representation step further comprising representing a panel of the one or more panels by one or more characteristic points connected by the one or more segments of its respective contour; and
   the constraint step further comprising imposing the one or more constraints on the one or more characteristic points for grading to the second size.

4. The computer implemented method according to claim 3, wherein the one or more contours of the one or more panels are represented by parametric curves comprising the one or more characteristic points.

5. The computer implemented method according to claim 1, the first representation step further comprising representing a grain line within a domain of a panel of the one or more panels; and
   the constraint step further comprising imposing a constraint on the grain line.

6. The computer implemented method according to claim 1, the first representation step further comprising representing a dart within a domain of a panel of the one or more panels; and
   the constraint step further comprising imposing a constraint on the dart.

7. The computer implemented method according to claim 1, the first representation step further comprising representing a decorative element within a domain of a panel of the one or more panels; and
   the constraint step further comprising imposing a constraint on the decorative element.

8. The computer implemented method according to claim 1, wherein the one or more constraints comprise at least one of:
   a seam constraint imposed at associated segments of the one or more segments and ensuring that said associated segments remain equally sized;
   a straight-line constraint;
   a distance constraint;
   a length constraint;
   an angle constraint; and
   an inequality constraint.

9. The computer implemented method according to claim 1, wherein the solving the system of equations into the second set of meshes further comprises minimizing a deformation energy of the second set of meshes with respect to the first set of meshes.

10. The computer implemented method according to claim 1, wherein the solving the system of equations into the second set of meshes further comprises morphing the first set of meshes into the second set of meshes.

11. A data processing system for grading a pattern suitable for fabricating a garment from a first size to a second size, the pattern comprising one or more panels, each panel comprising a two-dimensional closed domain, the system comprising:
    one or more processors; and
    one or more non-transitory computer-readable media having stored thereon executable instructions that when executed by the one or more processors configure the computer system to perform at least the following:
       a first representation step comprising representing each panel of the one or more panels by a contour enclosing its respective closed domain, wherein the contour comprises one or more segments;
       a constraint step comprising imposing one or more constraints on the one or more segments of the contour for grading to the second size;
       generating a mesh of each panel of the one or more panels thereby obtaining a first set of meshes;
       combining the first set of meshes with the constraints into a system of equations;
       solving the system of equations into a second set of meshes, wherein one or more contours of the second set of meshes correspond to the pattern in the second size; and
       determining the one or more contours of the second set of meshes.

12. A non-transitory computer-readable storage medium comprising a computer program product including instructions which, when executed by a computer, cause the computer to carry out a method for grading a pattern suitable for fabricating a garment from a first size to a second size, the pattern comprising one or more panels, each panel comprising a two-dimensional closed domain, the method comprising:
- a first representation step comprising representing each panel of the one or more panels by a contour enclosing its respective closed domain, wherein the contour comprises one or more segments;
- a constraint step comprising imposing one or more constraints on the one or more segments of the contour for grading to the second size;
- generating a mesh of each panel of the one or more panels thereby obtaining a first set of meshes;
- combining the first set of meshes with the constraints into a system of equations;
- solving the system of equations into a second set of meshes, wherein one or more contours of the second set of meshes correspond to the pattern in the second size; and
- determining the one or more contours of the second set of meshes.

* * * * *